(12) United States Patent
Gallagher et al.

(10) Patent No.: US 11,742,503 B2
(45) Date of Patent: Aug. 29, 2023

(54) METHOD AND SYSTEM FOR OPERATING AN ELECTROCHEMICAL FUEL CELL STACK WITH IMPROVED PERFORMANCE RECOVERY

(71) Applicant: BALLARD POWER SYSTEMS INC., Burnaby (CA)

(72) Inventors: Emerson R. Gallagher, Vancouver (CA); Alan Young, Surrey (CA); Yingduo Chen, Vancouver (CA)

(73) Assignee: BALLARD POWER SYSTEMS INC., Burnaby (CA)

( * ) Notice: Subject to any disclaimer, the term of this patent is extended or adjusted under 35 U.S.C. 154(b) by 183 days.

(21) Appl. No.: 17/291,155

(22) PCT Filed: Nov. 6, 2019

(86) PCT No.: PCT/US2019/060126
§ 371 (c)(1),
(2) Date: May 4, 2021

(87) PCT Pub. No.: WO2020/097240
PCT Pub. Date: May 14, 2020

(65) Prior Publication Data
US 2022/0077480 A1    Mar. 10, 2022

Related U.S. Application Data

(60) Provisional application No. 62/757,036, filed on Nov. 7, 2018.

(51) Int. Cl.
*H01M 8/04746*    (2016.01)
*H01M 8/04302*    (2016.01)
(Continued)

(52) U.S. Cl.
CPC .... *H01M 8/04753* (2013.01); *H01M 8/04302* (2016.02); *H01M 8/04303* (2016.02);
(Continued)

(58) Field of Classification Search
CPC ......... H01M 8/04302; H01M 8/04303; H01M 8/04559; H01M 8/04589; H01M 8/04679; H01M 8/04753; H01M 8/04955
See application file for complete search history.

(56) References Cited

U.S. PATENT DOCUMENTS 6,472,090 B1    10/2002   Colbow et al.
9,099,704 B2 *   8/2015   Jia .................... H01M 8/04302
(Continued)

*Primary Examiner* — Brittany L Raymond
(74) *Attorney, Agent, or Firm* — Seed Intellectual Property Law Group LLP

(57) ABSTRACT

A method is provided for operating a fuel cell stack with improved performance recovery from sub-saturated conditions, the method comprising setting an alert for the performance recovery of the fuel cell stack, performing at least one oxidant starvation by supplying oxidant at a stoichiometric ratio below 1 to the fuel cell stack in at least one pulse for a preset amount of time and at low current while the fuel cell stack does not generate power. The fuel cell system with an improved performance recovery comprises a shorting circuit which is connected to the fuel cell stack at predetermined times (startup, shutdown or standby mode) and an air compressor powered by a DC-DC converter which supplies a predetermined number of oxidant pulses of a predetermined duration to the fuel cell stack.

11 Claims, 3 Drawing Sheets

(51) Int. Cl.
*H01M 8/04303* (2016.01)
*H01M 8/04537* (2016.01)
*H01M 8/04664* (2016.01)
*H01M 8/04955* (2016.01)

(52) U.S. Cl.
CPC ... *H01M 8/04559* (2013.01); *H01M 8/04589* (2013.01); *H01M 8/04679* (2013.01); *H01M 8/04776* (2013.01); *H01M 8/04955* (2013.01)

(56) References Cited

U.S. PATENT DOCUMENTS

| | | | |
|---|---|---|---|
| 2003/0224228 A1* | 12/2003 | Reiser | H01M 8/04228 429/432 |
| 2007/0020491 A1* | 1/2007 | Ogburn | H01M 8/04753 429/432 |
| 2011/0008686 A1 | 1/2011 | Gould et al. | |

* cited by examiner

METHOD AND SYSTEM FOR OPERATING AN ELECTROCHEMICAL FUEL CELL STACK WITH IMPROVED PERFORMANCE RECOVERY

BACKGROUND

Technical Field

The present disclosure relates to a method of operating a fuel cell stack with improved performance recovery under sub-saturated conditions and a fuel cell system for implementing the method.

Description of the Related Art

Fuel cell systems convert reactants, namely fuel and oxidant, to electricity and are therefore used as power supplies in numerous applications, such as automobiles and stationary power plants. Such systems are a good solution for economically delivering power with environmental benefits.

Fuel cells generally employ an electrolyte disposed between two electrodes, namely a cathode and an anode. A catalyst typically induces the electrochemical reactions at the electrodes. Preferred fuel cell types include solid polymer electrolyte fuel cells that comprise a solid polymer electrolyte, for example a proton exchange membrane, and operate at relatively low temperatures. Proton exchange membrane fuel cells employ a membrane electrode assembly ("MEA") having a proton exchange membrane ("PEM") (also known as an ion-exchange membrane) interposed between an anode electrode and a cathode electrode. The anode electrode typically includes a catalyst and an ionomer, or a mixture of catalyst, ionomer and binder. The presence of ionomer in the catalyst layer effectively increases the electrochemically active surface area of the catalyst. The cathode electrode may similarly include a catalyst and a binder and/or an ionomer. Typically, the catalysts used in the anode and the cathode are platinum or platinum alloy. Each electrode generally includes a microporous, electrically conductive substrate, such as carbon fiber paper or carbon cloth, which provides mechanical support to the membrane and is employed for reactant distribution, thus serving as a gas diffusion layer (GDL).

The membrane electrode assembly is typically disposed between two electrically conductive flow field plates or separator plates and thereby forms a fuel cell assembly. These flow field plates act as current collectors, provide support for the adjacent electrodes and also allow access of reactants to the MEA. A fuel cell stack comprises several fuel cells compressed between end plates.

During the fuel cell stack operation, a primary load is drawn from the fuel cell stack. In each fuel cell from the stack at the anode, fuel (generally in the form of hydrogen gas) reacts at the anode electrocatalyst in the presence of PEM to form hydrogen ions and electrons. At the cathode, oxidant (generally oxygen from the air) reacts with the hydrogen ions, which pass through the PEM, in the presence of the cathode electrocatalyst to form water. The electrons pass through an external circuit, creating a flow of electricity to sustain the primary load. In practice, fuel cells need to maintain their performance in different operating conditions.

Tests have shown that fuel cell stacks which are exposed to low humidity, sub-saturated conditions, for example to oxidant supply with 60 to 80% relative humidity lose performance at a much greater rate than expected. It is estimated that in conditions of decreased gas humidity, the ionomer density within the fuel cell electrodes is increased and this increases the oxygen transport resistance through the ionomer film resulting in performance loss.

It is known that conducting air starvation periods during fuel cell operation can cause the sulfonic acid groups to move away from the surface of the catalyst improving oxygen transport within the fuel cell.

Air starvation techniques have been employed in the prior art for removing the poisons and impurities that adsorb onto the platinum electrocatalyst to thereby improve fuel cell performance. For example U.S. Pat. No. 9,099,704 describes a method of removing contaminants in a fuel cell by performing at least one oxidant starvation while drawing a primary load, removing the primary load after performing the oxidation starvation and bringing the anode to a high potential after removing the primary load, then restarting the fuel cell.

In another prior art document, U.S. Pat. No. 6,472,090, reactant starvation at both the anode and cathode was performed periodically for the removal of electrocatalyst poisons while continuing to produce electrical power from the fuel cell.

With all the advances in the technology to improve cell performance there is still a need to solve the problem of performance degradation for fuel cell stacks running at high current in low humidity, sub-saturated conditions.

BRIEF SUMMARY

Briefly summarized, one or more embodiments of the present methods of operating a fuel cell stack with improved performance recovery from sub-saturated conditions comprise setting an alert for the performance recovery of the fuel cell stack, performing oxidant starvation for a predetermined amount of time by supplying oxidant at a stoichiometric ratio below 1 to the fuel cell stack in at least one pulse and at low current while the fuel cell stack does not generate power.

The alert for the fuel cell stack performance recovery is set by turning a system recovery flag to ON. The method may further comprise measuring the voltage across the fuel cell and setting the alert for the performance recovery of the fuel cell stack when the voltage across the fuel cell falls below a predetermined limit for example when the monitored voltage of the fuel cell stack drops below a value of about 25 mV per cell. Alternatively, the alert for the performance recovery of the fuel cell stack may be set at predetermined times independently of the stack voltage measurement, as a preemptive measure. For example, the alert for the performance recovery can be set at intervals of 12 hours or 24 hours of operation.

In at least some implementations of the present method, the oxidant starvation is performed during the fuel cell startup or shutdown or during the time when the fuel cell stack is in its run state.

A preferred value for the stoichiometric ratio of oxidant supply is around 0.8.

In preferred embodiments, the step of oxidant starvation can last up to 60 seconds and it involves supplying between one to four pulses of oxidant to the fuel cell stack at a stoichiometric ratio of below 1, wherein each pulse is at least 10 seconds long.

In the present method, the air starvation is performed at low current, respectively at a stack current density between 0.08 A/cm$^2$ to around 0.25 A/cm$^2$.

Once the alert for the performance recovery was set, the method further comprises measuring the voltage across the fuel cell stack, when the fuel cell stack is in startup state or in shutdown state, and performing the oxidant starvation when the voltage across the fuel cell stack falls below a predetermined limit.

Alternatively, if the fuel cell stack is in run state, once the alert for the performance recovery was set, the method comprises measuring the fuel cell stack current, switching the stack to a bleed-down mode when its operating current is below a predetermined limit and performing the oxidant starvation when the voltage across the fuel cell stack falls below a predetermined limit.

In all cases, the predetermined limit for starting the oxidant starvation is when the voltage across the fuel cell stack is around 0.05 V per cell in the stack. When the stack is in run state, the predetermined limit for switching the stack to a bleed-down mode is when the operating current is below an operating current corresponding to a current density of around 0.015 A/cm$^2$.

A fuel cell system with improved stack performance recovery from sub-saturated conditions is also disclosed comprising a fuel cell stack, an air compressor, a DC-DC converter, a shorting circuit and a control system for controlling the air compressor to supply oxidant to the fuel cell stack at a stoichiometric ratio below 1, for a predetermined amount of time, and in at least one pulse of a predetermined duration, at low current and while the fuel cell does not generate power.

The fuel cell control system also controls the shorting circuit. The shorting circuit comprises a shorting device and in some embodiments it can also comprise a shorting resistance for controlling the voltage across the fuel cell stack during shorting. Maintaining the stack voltage above a predetermined limit, which can be around 0.05 V up to 0.2 V per cell, prevents the phenomenon of hydrogen pumping across the membrane which can negatively impact the system's hydrogen emissions performance. In systems where the hydrogen pumping does not occur or where the hydrogen emissions can be addressed in a different way, the shorting device does not comprise a shorting resistance.

These and other aspects of the present disclosure will be evident upon reference to the following detailed description and attached drawings.

DETAILED DESCRIPTION

In the following description, certain specific details are set forth in order to provide a thorough understanding of the various embodiments. However, one skilled in the art will understand that one or more of the embodiments of the present disclosure may be practiced without these details. In other instances, well-known structures associated with fuel cells, fuel cell stacks, and fuel cell systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense. Also, reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
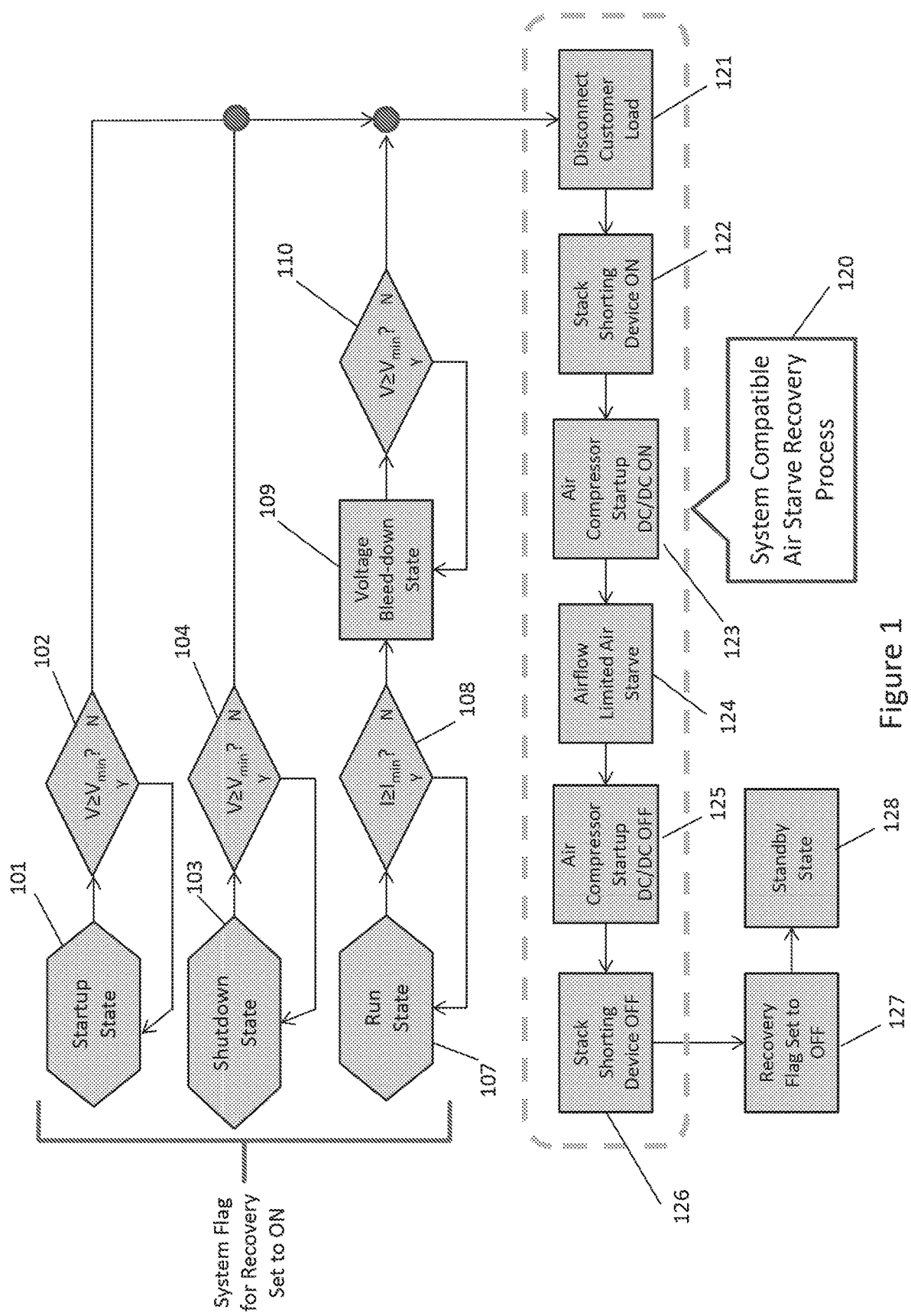
FIG. 1 shows the schematic of the steps involved in a method of the present disclosure according to one or more embodiments.

FIG. 1 illustrates the steps of the present method of operating a fuel cell stack with improved performance recovery under sub-saturated conditions. The voltage across the fuel cell stack is continuously monitored and when the voltage across the fuel cell stack falls below a certain limit, the system is alerted for the necessity of performance recovery from sub-saturated conditions by setting a system recovery flag ON. For example, when the monitored voltage of the fuel cell stack drops below a value of about 25 mV per cell, the flag for recovery can be set to "ON". Alternatively, the flag for recovery can be set to "ON" at predetermined times (e.g. every 12 hours or every 24 hours) as a preemptive measure.

After the system flag for recovery is set to "ON", the voltage and the current of the fuel cell stack are measured. If the fuel cell stack is in startup state (101), the measured voltage is compared with a reference point $V_{min}$ in step (102). If the measured voltage is higher than a low limit ($V_{min}$) the fuel cell stack continues to operate in its startup state (101). If the measured voltage is below the low limit $V_{min}$ the fuel cell stack goes into the air starvation performance recovery mode (120).

Similarly, if the fuel cell stack is in shutdown state (103), the measured voltage is compared with a reference point $V_{min}$ in step (104). If the measured voltage is higher than a low limit ($V_{min}$) the fuel cell stack continues to operate in its shutdown state (103). If the measured voltage is below the low limit $V_{min}$ the fuel cell stack goes into the air starvation performance recovery mode (120).

Alternatively, when the fuel cell stack is in its run state (107) (normal operation mode), its operating current is compared to an $I_{min}$ current, as shown in step (108), and if the fuel cell stack operates at a current higher than $I_{min}$, the fuel cell stack continues to operate in its run state until the current drops below low limit $I_{min}$ when the fuel cell stack goes into a voltage bleed-down state (109) which is performed as long as the voltage across the fuel cell stack is higher than a voltage low limit $V_{min}$ as measured during step (110) which compares the two values. When the voltage across the fuel cell stack becomes lower than $V_{min}$ the fuel cell stack goes into the air starve performance recovery mode (120). During the voltage bleed-down mode a bleed resistor is connected to the stack to drop the stack voltage.

During the above states (startup, shut-down and voltage bleed-down) the fuel cell stack does not deliver any power.

It has been found that a value for $V_{min}$ of around 0.05 V per cell, respectively around 9V for a stack of 180 cells and a value for $I_{min}$ corresponding to a current density of up to around 0.015 A/cm2 should be applied to the above steps in the present method.

In a first step (121) of the air starve recovery mode (120), the fuel cell stack is disconnected from the load. In the next step (122) a stack shorting device is connected to the fuel cell stack and then in step (123) the system's air compressor is connected to a DC-DC converter which supplies up to 10% of the compressor's rated power. In the next step (124), the air compressor supplies at least one pulse of oxidant (air) for a preset duration to the fuel cell stack at a stoichiometric rate of around 0.8 and at low current.

If this step is performed during shutdown, the fuel cell stack current density is ramped down to a low current density of around 0.08 A/cm$^2$ from around 1 to 1.5 A/cm2 which is provided during the steady state operation. Generally, during the performance recovery procedure, the fuel cell stack operates at a low current density of between around 0.08 to around 0.25 A/cm$^2$.

The oxidant can be supplied to the fuel cell stack in one pulse with a duration of 60 seconds. In some embodiments, one pulse of 10 seconds has been demonstrated to also achieve good performance recovery results. Yet in other embodiments, more than one pulse of oxidant is supplied to the fuel cell stack. For example, four pulses of oxidant, each of duration of 10 seconds have also proved to maintain the average cell voltage at a constant level which is an indication of performance recovery. Generally a total time of up to around 60 seconds for the total duration of the air oxidant pulses has provided good results.

In the next step (125), after the oxidant has been supplied to the fuel cell stack as described above, the air compressor is stopped by stopping the DC-DC converter and in the next step (126), the stack shorting device is disconnected from the fuel cell stack, the system recovery flag is turned off in step (127) and the fuel cell stack is returned in a standby state at step (128), while it is not producing any power. The stack will be started again when power needs to be provided to the customer load.

Figure 2:
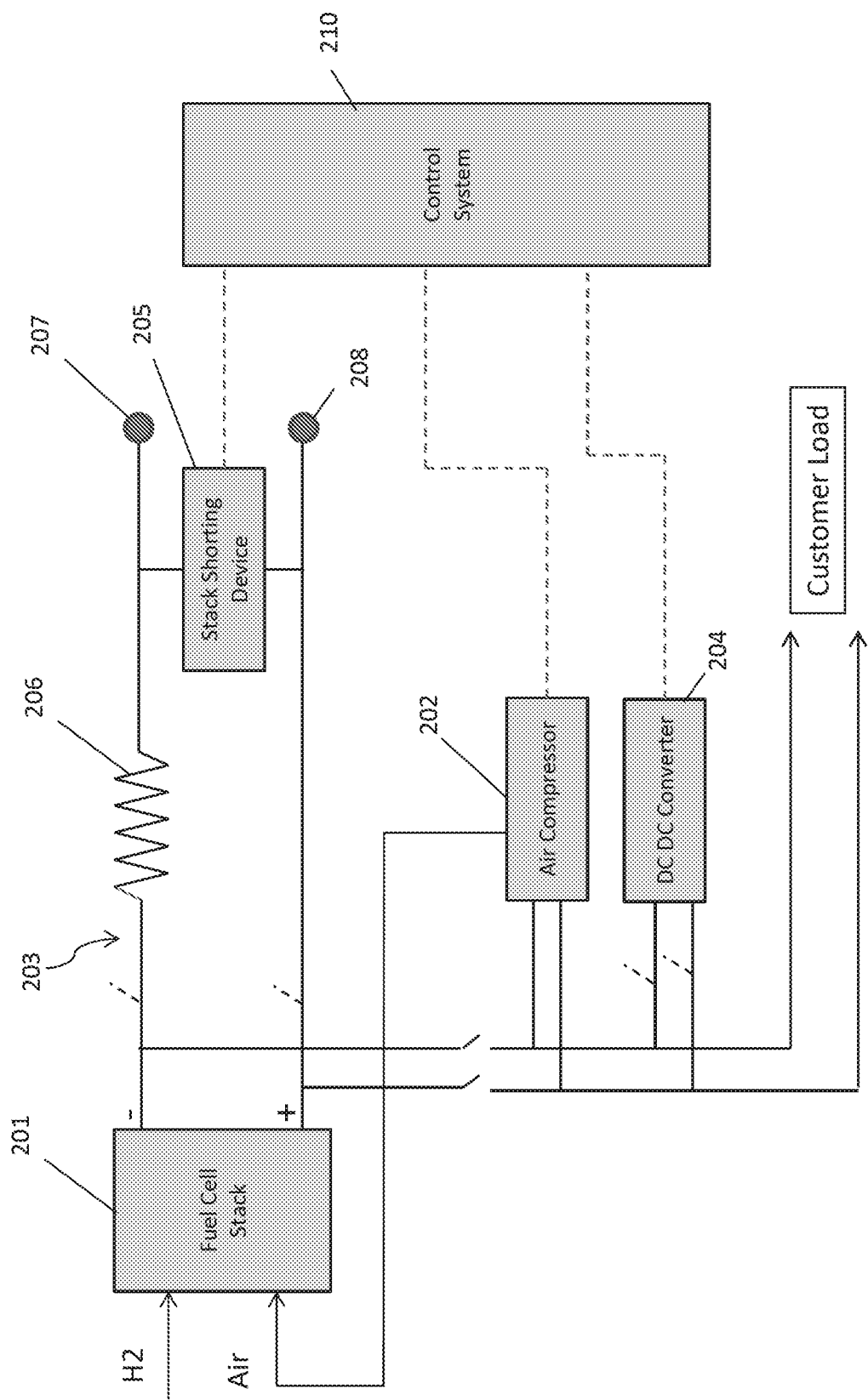
FIG. 2 shows a schematic of an embodiment of the present system.

FIG. 2 illustrates the system for implementing the method of performance recovery described above. System 200 comprises a fuel cell stack 201, which in normal operating conditions is connected to the customer load, and an air compressor 202, which provides the oxidant supply (air) to the fuel cell stack and which in normal operating conditions is preferably powered by the fuel cell stack. When the system flag for recovery is set to ON, and the air starve performance recovery mode is started, the fuel cell stack is disconnected from the customer load and the fuel cell stack is connected to the shorting circuit 203 (as shown in FIG. 2). The air compressor 202 is powered by a DC-DC converter 204 and is controlled by the control system 210 to provide a reduced air supply to the fuel cell stack in pulses of a predetermined duration according to the method described above.

The shorting circuit comprises a shorting device 205 and it can optionally comprise a shorting resistance 206. The shorting resistance helps to keep the voltage across the fuel cell stack within a predetermined range (preferably higher than between around 0.05 to around 0.2 V per cell) to avoid hydrogen pumping across the membrane and thereby prevent potential system hydrogen emission issues. In systems where it was determined that no hydrogen pulsing occurs, or no hydrogen emissions are generated during this process, or in systems which can address the hydrogen emissions from the fuel cell stack in another way, such a resistor is not required. A voltage sensor 207 and a current sensor 208 measure the stack voltage and current.

The control system 210 controls the operation of the air compressor 202, of the DC-DC converter 204 and of the stack shorting device 205.

Figure 3:
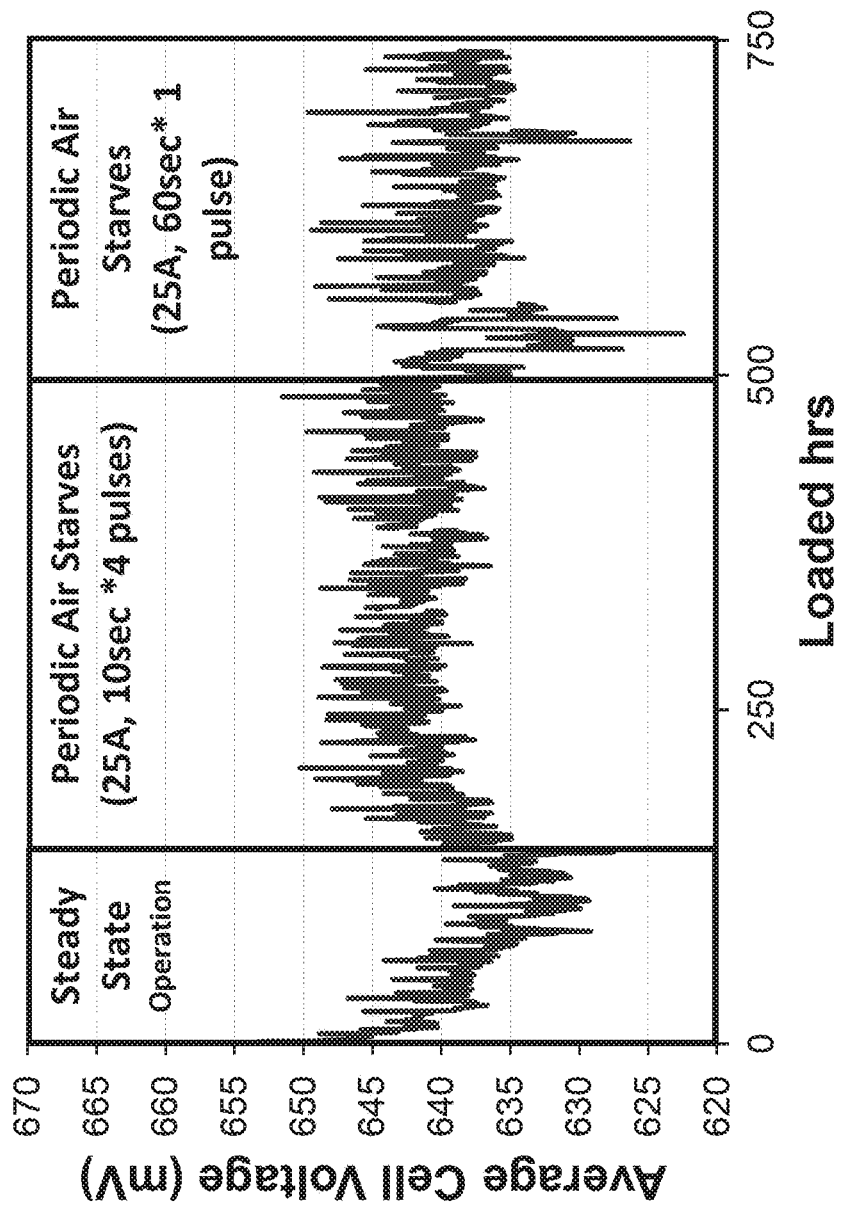
FIG. 3 shows improvement in performance achieved with two embodiments of the present method.

FIG. 3 illustrates the improved performance of a stack operated according to the present method. The graph presents the average cell voltage for a stack operated in the steady state according to a standard operation, known in the art, which does not involve any air starvation, the average cell voltage for a stack operated at a current of 25 A with 4 pulses of air starves (air supplied at an 0.8 stoichiometric ratio), each pulse of a duration of 10 seconds and the average cell voltage for a stack operated at a current of 25 A with a single pulse of air starve (at a stoichiometric ratio of around 0.8).

As shown in FIG. 3, both methods of air starvation managed to preserve a constant average cell voltage, as opposed to the steady state operation without any air starvation where the average cell voltage has dropped over time.

Therefore the embodiments provided herein have the advantage that allows a steady performance of the fuel cell over time and maintaining a constant voltage operation.

U.S. provisional patent application No. 62/757,036, filed Nov. 7, 2018, is hereby incorporated herein by reference in its entirety. From the foregoing, it will be appreciated that, although specific embodiments have been described herein for the purpose of illustration, various modifications may be made without departing from the spirit and scope of the present disclosure. Accordingly, the present disclosure is not limited except by the appended claims.

What is claimed is:

1. A method of operating a fuel cell stack with improved performance recovery from sub-saturated conditions, the method comprising:
    setting an alert for the performance recovery of the fuel cell stack, performing oxidant starvation during the fuel cell stack startup or shutdown or during the time the fuel cell stack is in its run state for a predetermined amount of time by supplying oxidant at a stoichiometric ratio below 1 to the fuel cell stack in at least one pulse and at low current while the fuel cell stack does not generate power and while the fuel cell stack is disconnected from a load and a stack shorting device is connected to the fuel cell stack; and
    when the fuel cell stack is in run state, measuring the fuel cell stack current, switching the stack to a bleed-down mode when its operating current is below a predetermined limit and performing the oxidant starvation when the voltage across the fuel cell stack falls below a predetermined limit.

2. The method of claim 1 wherein the stoichiometric ratio of oxidant supply is around 0.8.

3. The method of claim 1 wherein the predetermined amount of time for oxidant starvation is up to 60 seconds.

4. The method of claim 3 wherein between one to four pulses of oxidant are supplied to the fuel cell stack at a stoichiometric ratio of below 1, wherein each pulse is at least 10 seconds long.

5. The method of claim 1 wherein the low current corresponds to a current density of between around 0.08 A/cm2 to around 0.25 A/cm2.

6. The method of claim 1 further comprising measuring the voltage across the fuel cell stack when the fuel cell stack is in startup state or in shutdown state and performing the oxidant starvation when the voltage across the fuel cell stack falls below a predetermined limit.

7. The method of claim 6 wherein the predetermined limit for the voltage across the fuel cell stack is around 0.05 V per cell in the stack.

8. The method of claim 1 wherein the predetermined limit for the operating current corresponds to a current density of around 0.015 A/cm2 and the predetermined limit for the voltage across the fuel cell stack is around 0.05 V per cell in the stack.

9. The method of claim 1 wherein the alert for the performance recovery of the fuel cell stack is set at predetermined times.

10. The method of claim 1 wherein the alert for the performance recovery of the fuel cell stack is set when the voltage of the fuel cell stack drops below a value of about 25 mV per cell.

11. The method of claim 1, further comprising controlling a stack voltage across the fuel cell stack by controlling the stack shorting device to maintain the stack voltage across the fuel cell stack within a range of between 0.15 to 0.2 Volts per cell.

\* \* \* \* \*